United States Patent
Thuilliez et al.

(10) Patent No.: US 12,528,932 B2
(45) Date of Patent: Jan. 20, 2026

(54) COMPOSITE COMPRISING A REINFORCING ELEMENT AND A RUBBER COMPOSITION

(71) Applicant: COMPAGNIE GENERALE DES ETABLISSEMENTS MICHELIN, Clermont-Ferrand (FR)

(72) Inventors: Anne-Lise Thuilliez, Clermont-Ferrand (FR); Francois Jean-Baptiste-Dit-Dominique, Clermont-Ferrand (FR); Adeline Jasselin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 603 days.

(21) Appl. No.: 17/784,270

(22) PCT Filed: Dec. 8, 2020

(86) PCT No.: PCT/FR2020/052329
§ 371 (c)(1),
(2) Date: Jun. 10, 2022

(87) PCT Pub. No.: WO2021/116588
PCT Pub. Date: Jun. 17, 2021

(65) Prior Publication Data
US 2023/0077022 A1    Mar. 9, 2023

(30) Foreign Application Priority Data
Dec. 12, 2019    (FR) ...................... 1914246

(51) Int. Cl.
| | |
|---|---|
| C08K 5/134 | (2006.01) |
| B60C 1/00 | (2006.01) |
| C08K 3/04 | (2006.01) |
| C08K 3/36 | (2006.01) |
| C08K 5/42 | (2006.01) |
| C08K 5/5333 | (2006.01) |

(52) U.S. Cl.
CPC .............. *C08K 5/1345* (2013.01); *B60C 1/00* (2013.01); *C08K 3/04* (2013.01); *C08K 3/36* (2013.01); *C08K 5/42* (2013.01); *C08K 5/5333* (2013.01)

(58) Field of Classification Search
CPC .......... C08K 5/1345; C08K 3/04; C08K 3/36; C08K 5/42; C08K 5/5333; C08K 5/13; C08K 9/06; B60C 1/00; C08J 3/24; C08J 2315/00; C08L 7/00; C08L 15/00
See application file for complete search history.

(56) References Cited

U.S. PATENT DOCUMENTS

| | | | |
|---|---|---|---|
| 6,140,393 A | 10/2000 | Bomal et al. | |
| 6,774,255 B1 | 8/2004 | Tardivat et al. | |
| 10,030,116 B2 | 7/2018 | Salit et al. | |
| 10,544,292 B2 | 1/2020 | Doisneau et al. | |
| 11,572,458 B2 | 2/2023 | Thuilliez et al. | |
| 2003/0212185 A1 | 11/2003 | Vasseur | |
| 2004/0051210 A1 | 3/2004 | Tardivat et al. | |

(Continued)

FOREIGN PATENT DOCUMENTS

| | | |
|---|---|---|
| CN | 108624062 A | 10/2018 |
| EP | 0763564 A2 | 3/1997 |

(Continued)

OTHER PUBLICATIONS

International Search Report dated Mar. 25, 2021, in corresponding PCT/FR2020/052329 (5 pages).
Y. Li, et al., "Molecular Structures of the Products of a Diphosphonate Ester Building Block with Lewis Bases", Molecules 2015, 20, 14435-14450.

(Continued)

*Primary Examiner* — Mark Eashoo
*Assistant Examiner* — Zhen Liu
(74) *Attorney, Agent, or Firm* — VENABLE LLP

(57) ABSTRACT

A composite is based on at least one reinforcing element and on a rubber composition based on at least a. an epoxidized diene elastomer, b. a reinforcing filler, and c. a system for crosslinking comprising at least: a polyacid compound selected from organopolyphosphorus compounds of general formula (I) and polysulfonic acids of general formula (II), and a polyphenol compound comprising at least two hydroxyl —OH functions on the same aromatic ring,

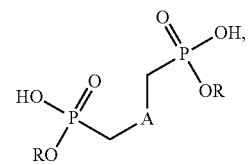
Formula I in which A represents a covalent bond or a hydrocarbon group comprising at least 1 carbon atom, which is optionally substituted and optionally interrupted by one or more heteroatoms, and the R symbols represent a hydrocarbon group comprising at least 1 carbon atom or a hydrogen atom; and

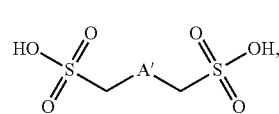
Formula II in which A' represents the same as A above.

15 Claims, No Drawings

(56) References Cited

U.S. PATENT DOCUMENTS

| | | |
|---|---|---|
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2006/0199917 A1* | 9/2006 | Chino ............... C08F 8/30 524/493 |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-pain et al. |
| 2009/0292063 A1 | 11/2009 | Robert et al. |
| 2009/0297827 A1 | 12/2009 | Lapra et al. |
| 2010/0022714 A1 | 1/2010 | Varagniat et al. |
| 2011/0009547 A1 | 1/2011 | Araujo Da Silva et al. |
| 2011/0021702 A1 | 1/2011 | Gandon-Pain et al. |
| 2015/0299435 A1 | 10/2015 | Fleury et al. |
| 2015/0322234 A1 | 11/2015 | Fleury et al. |
| 2015/0337109 A1 | 11/2015 | Fleury et al. |
| 2015/0368444 A1 | 12/2015 | Fleury et al. |
| 2017/0166010 A1* | 6/2017 | Michoud ............... B60C 9/0007 |
| 2018/0009972 A1 | 1/2018 | Doisneau et al. |
| 2018/0326786 A1 | 11/2018 | Thuilliez et al. |
| 2018/0371141 A1 | 12/2018 | Thuilliez et al. |
| 2021/0087366 A1 | 3/2021 | Thuilliez et al. |
| 2021/0380784 A1 | 12/2021 | Thuilliez et al. |
| 2024/0101797 A1 | 3/2024 | Jasselin et al. |
| 2024/0174024 A1 | 5/2024 | Thuilliez et al. |

FOREIGN PATENT DOCUMENTS

| | | |
|---|---|---|
| EP | 0784072 A1 | 7/1997 |
| EP | 1403287 A1 | 3/2004 |
| FR | 2999586 A1 | 6/2014 |
| FR | 3031746 A1 | 7/2016 |
| FR | 3043591 A1 | 5/2017 |
| JP | 2007-269658 A | 10/2007 |
| JP | 2012-211122 A | 11/2012 |
| WO | 97/36724 A2 | 10/1997 |
| WO | 99/16600 A1 | 4/1999 |
| WO | 02/10269 A2 | 2/2002 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007/003408 A1 | 1/2007 |
| WO | 2007/017060 A1 | 2/2007 |
| WO | 2008/003434 A1 | 1/2008 |
| WO | 2008/003435 A1 | 1/2008 |
| WO | 2009/062733 A2 | 5/2009 |
| WO | 2014/095582 A1 | 6/2014 |
| WO | 2014/095583 A1 | 6/2014 |
| WO | 2014/095585 A1 | 6/2014 |
| WO | 2014/095586 A1 | 6/2014 |
| WO | 2017/081387 A1 | 5/2017 |
| WO | 2017/081388 A1 | 5/2017 |
| WO | 2019/122587 A1 | 6/2019 |

OTHER PUBLICATIONS

M.R. Gimmett, "Product Class 3: Imidazoles", Science of Synthesis, 2002, 12.3, 325-528.

Y. Chang, et al., "Thermomechanical properties and shape memory effect of epoxidized natural rubber crosslinked by 3-amino-1,2,4-triazole", Polym Int 56: 694-698 (2007).

N. Belkhouche, et al., "Study of New Organophosphorous Derivates Carriers on the Selective Recovery of M (II) and M (III) Metals, Using Supported Liquid Membrane Extraction," J. Membrane Sci., vol. 284, pp. 398-405 (2006).

* cited by examiner

COMPOSITE COMPRISING A REINFORCING ELEMENT AND A RUBBER COMPOSITION

TECHNICAL FIELD OF THE INVENTION

The present invention relates to a composite comprising a reinforcing element and a rubber composition, finished or semi-finished articles and tires comprising these composites.

PRIOR ART

It is known, and has been common practice for a great many years, to use, in tires, rubber compositions having an elastomer matrix which is crosslinked with sulfur, this crosslinking then being known as vulcanization. The conventional vulcanization system combines molecular sulfur and at least one vulcanization accelerator. However, it is known that such a system may be detrimental to the processing of the composition before curing by the scorching phenomenon. It will be recalled that the "scorching" phenomenon rapidly results, during the preparation of the rubber compositions, in premature vulcanizations ("scorching"), in very high viscosities in the green state, and finally in rubber compositions which are difficult to work and to process industrially.

Consequently, vulcanization systems have been improved over the years, in combination with the processes for preparing rubber compositions, in order to control the above-mentioned drawbacks. Thus, the compositions are often complex and comprise, in addition to the molecular sulfur or an agent which donates molecular sulfur, vulcanization accelerators, activators and optionally vulcanization retarders.

Among the various parts of a tire, the reinforcing plies, which in a known manner comprise a rubber composition and, for example metallic, reinforcing cords embedded in the rubber composition, generally require specific formulations for the rubber composition.

In order to effectively fulfil their function of reinforcing these plies, which are subjected, as is known, to very high stresses during running of the tires, the threadlike metallic reinforcing elements must satisfy a very large number of sometimes contradictory technical criteria, such as high fatigue endurance, high tensile strength, high wear resistance, high corrosion resistance and strong adhesion to the surrounding rubber, and be capable of maintaining these performance qualities at a very high level for as long as possible.

It is easily understood that the adhesion between the rubber and the threadlike metallic reinforcing elements is thus a key property in the durability of these performance qualities. For example, the conventional process for connecting the rubber to steel consists in coating the surface of the steel with brass (copper-zinc alloy), the bond between the steel and the rubber being provided by sulfurization of the brass during the vulcanization or curing of the elastomer present in the rubber.

In order, in particular, to ensure this adhesion function, the rubber composition in these reinforcing plies accordingly requires a high content of sulfur and of zinc oxide, a low amount of stearic acid, the presence of cobalt salt and the use of an accelerator having a long delay phase. However, these vulcanization systems with a high sulfur content are accompanied by several drawbacks in addition to the complexity of their composition. Specifically, these vulcanization systems with a high sulfur content constitute a major constraint during the manufacture of semi-finished articles, in particular for avoiding premature crosslinking. In addition, it is known that the adhesion between the steel and the rubber is capable of weakening over time as a result of the gradual development of sulfides formed under the effect of the various stresses encountered, in particular mechanical and/or thermal stresses.

It is thus an ongoing concern of tire manufacturers to find composites based on metal and on a diene polymer matrix which are alternative solutions to the pre-existing composites and which are cohesive without it being necessary to resort to a sulfurization step.

Studies have been conducted to develop alternative crosslinking systems to vulcanization, while at the same time simplifying the compositions and their preparation. Thus, documents WO2014095582, WO2014095583, WO2014095585 and WO2014095586 describe rubber compositions for tires based on at least one polymer comprising epoxide functions, on a system for crosslinking said polymer comprising a polycarboxylic acid and on an imidazole compound. The polymer comprising epoxide functions is a diene elastomer forming the elastomer matrix. These compositions have the double advantage of a simplified preparation compared with conventional compositions comprising a vulcanization system, and of improved hysteresis properties.

The epoxidized natural rubber may also be crosslinked with amines, a reaction which can be catalyzed by bisphenol A (Polym Int 56:694-698 (2007)).

However, these documents do not address the problem of adhesion to the reinforcing elements.

The documents WO 2017/081387 and WO 2017/081388 present a rubber composition and a composite based on a polymer matrix comprising a functional diene polymer. This functional diene polymer bears at least one aromatic group substituted by at least two vicinal hydroxyl functions. The crosslinking of the rubber composition is carried out by a vulcanization system or a system based on one or more peroxide compounds. Good properties of adhesion of the rubber composition to the metal are obtained, but require the use of a grafted polymer.

It is also known from FR3043591 that the addition of polyphenol to compositions based on NR and on a filler and crosslinked by a peroxide makes it possible to achieve levels of adhesion comparable to those of conventional vulcanizates.

Document WO2019122587 for its part describes a rubber composition based on at least one elastomer comprising epoxide functions, a reinforcing filler, a crosslinking system comprising a polycarboxylic acid, an imidazole and at least one specific phenolic compound. Advantageous characteristics of adhesion of this rubber composition to a reinforcing element were observed.

Pursuing their research, the inventors have now found that particular crosslinkable compositions could be prepared in a simplified manner compared to prior art compositions, and that these compositions could exhibit properties of adhesion to a reinforcing element that are advantageous or even improved compared to prior art rubber compositions based on an epoxidized elastomer having a crosslinking system comprising a polycarboxylic acid. These compositions can advantageously be used to manufacture composites based on at least one, in particular metallic, reinforcing element.

SUMMARY OF THE INVENTION

The invention, which is described in greater detail below, has as subject at least one of the embodiments listed in the following points:

1. A composite based on at least one reinforcing element and on a rubber composition based on at least
   a. an epoxidized diene elastomer,
   b. a reinforcing filler, and
   c. a system for crosslinking the epoxidized diene elastomer comprising at least:
      a polyacid compound selected from organopolyphosphorus compounds of general formula (I) and polysulfonic acids of general formula (II), and
      a polyphenol compound comprising at least two hydroxyl —OH functions on the same aromatic ring,

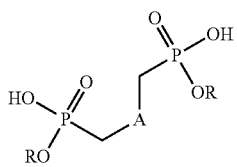

Formula I in which
A represents a covalent bond or a hydrocarbon group comprising at least 1 carbon atom, which is optionally substituted and optionally interrupted by one or more heteroatoms, and
the R symbols represent, independently of one another, a hydrocarbon group comprising at least 1 carbon atom or a hydrogen atom;

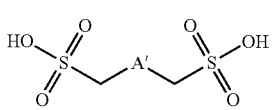

Formula II in which
A' represents a covalent bond or a hydrocarbon group comprising at least 1 carbon atom, which is optionally substituted and optionally interrupted by one or more heteroatoms.
2. A composite according to the preceding embodiment, in which the reinforcing element comprises a metallic surface.
3. A composite according to the preceding embodiment, in which the metallic surface of said reinforcing element comprises a metal chosen from the group consisting of iron, copper, zinc, tin, aluminium, cobalt, nickel and alloys comprising at least one of these metals.
4. A composite according to the preceding embodiment, in which the metal of the metallic surface is brass or steel.
5. A composite according to any one of the preceding embodiments, in which the polyacid is a diacid.
6. A composite according to any one of the preceding embodiments, in which A represents a covalent bond or a divalent hydrocarbon group comprising at least 1, preferably at least 2, more preferentially at least 4, and at most 1800 carbon atoms, preferably at most 100 carbon atoms, more preferentially at most 65 carbon atoms, or even at most 30 carbon atoms.
7. A composite according to any one of the preceding embodiments, in which A is a divalent aliphatic hydrocarbon group or a divalent aromatic hydrocarbon group, or a divalent group comprising at least one aliphatic part and one aromatic part.
8. A composite according to any one of the preceding embodiments, in which A is a hydrocarbon group comprising at least 1 carbon atom interrupted by at least one heteroatom selected from oxygen, nitrogen and sulfur, preferably oxygen.
9. A composite according to any one of the preceding embodiments, in which A is a divalent aromatic hydrocarbon group, or a divalent group comprising at least one aliphatic part and one aromatic part.
10. A composite according to the preceding embodiment, in which the divalent aromatic hydrocarbon group or the aromatic part of the divalent group comprising at least one aliphatic part comprises at least 6 carbon atoms and at most 18 carbon atoms, preferably 6 carbon atoms.
11. A composite according to the preceding embodiment, in which A is an unsubstituted divalent aromatic group comprising 6 carbon atoms.
12. A composite according to any one of the preceding embodiments, in which A' represents a covalent bond or a divalent hydrocarbon group comprising at least 1, preferably at least 2, more preferentially at least 4, and at most 1800 carbon atoms, preferably at most 100 carbon atoms, more preferentially at most 30 carbon atoms.
13. A composite according to any one of the preceding embodiments, in which, when A' is a divalent hydrocarbon group comprising at least 1 carbon atom, A' is a divalent aliphatic hydrocarbon group or a divalent aromatic hydrocarbon group, or a divalent group comprising at least one aliphatic part and one aromatic part.
14. A composite according to any one of the preceding embodiments, in which, when A' is a hydrocarbon group comprising at least 1 carbon atom, it is interrupted by at least one heteroatom selected from oxygen, nitrogen and sulfur, preferably oxygen.
15. A composite according to any one of the preceding embodiments, in which A' represents a covalent bond.
16. A composite according to any one of the preceding embodiments, in which the R symbols represent, independently of one another, a hydrogen atom or an alkyl group having from 1 to 20 carbon atoms, preferably 1 to 12 carbon atoms, a cycloalkyl group having from 5 to 24 carbon atoms, an aryl group having from 6 to 30 carbon atoms or an aralkyl group having from 7 to 25 carbon atoms.
17. A composite according to any one of the preceding embodiments, in which the R symbols are identical.
18. A composite according to any one of the preceding embodiments, in which the R symbols represent a hydrogen atom or an alkyl group having from 1 to 12 carbon atoms, preferably from 1 to 4 carbon atoms.
19. A composite according to the preceding embodiment, in which the R symbols represent an alkyl group having from 1 to 12 carbon atoms, preferably from 1 to 4 carbon atoms.
20. A composite according to any one of the preceding embodiments, in which the polyphenol compound is a compound comprising at least one aromatic ring comprising 6 carbon atoms, each ring comprising at least 2 hydroxyl —OH functions.
21. A composite according to any one of the preceding embodiments, in which the polyphenol compound comprising at least two hydroxyl —OH functions on the same aromatic ring corresponds to the general formula (III)

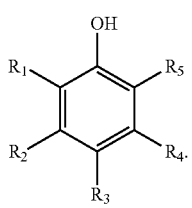

Formula III in which the $R_1$, $R_2$, $R_3$, $R_4$ and $R_5$ groups, independently of one another, denote groups selected from a hydrogen atom, the radicals hydroxyl, thiol, hydroxyalkenyl, carboxyl, hydrogenocarbonyl, alkyl, carboxylalkyl, carboxylalkenyl, carbonylalkyl, aryl, aryloxy, arylthioxy, arylcarbonyl, amino, aminoalkyl, ethers, esters, and thioesters, with the proviso that at least one of $R_1$, $R_2$, $R_3$, $R_4$ and $R_5$ denotes a hydroxyl radical.

22. A composite according to any one of embodiments 1 to 20, in which the polyphenol compound is a compound comprising at least two, preferably at least three, aromatic rings comprising 6 carbon atoms, each ring comprising at least 2 hydroxyl —OH functions.

23. A composite according to the preceding embodiment, in which the polyphenol compound has a number-average molar mass preferentially of greater than 600 g/mol, preferentially greater than 800 g/mol, preferably greater than 1000 g/mol and very preferably greater than 1200 g/mol.

24. A composite according to the preceding embodiment, in which the polyphenol compound is selected from gallotannins.

25. A composite according to the preceding embodiment, in which the polyphenol compound is tannic acid.

26. A composite according to any one of the preceding embodiments, in which the rubber composition comprises an imidazole compound in a content ranging from 0.01 to 4 molar equivalents, relative to the phosphonic and sulfonic acid functions.

27. A composite according to any one of the preceding embodiments, in which the reinforcing filler comprises carbon black, silica or a mixture of carbon black and silica.

28. A composite according to any one of the preceding embodiments, in which the content of reinforcing filler in the rubber composition is between 20 and 180 phr.

29. A composite according to any one of the preceding embodiments, in which the reinforcing filler predominantly comprises carbon black, and preferentially consists of carbon black.

30. A composite according to the preceding embodiment, in which the polyacid compound is a polyorganophosphorus compound of general formula (I).

31. A composite according to any one of embodiments 22 to 28, in which the polyphenol compound comprises at least two, preferably at least three, aromatic rings comprising 6 carbon atoms, each ring comprising at least 2 hydroxyl —OH functions, and in which the reinforcing filler predominantly comprises silica.

32. A composite according to any one of the preceding embodiments, in which the epoxidized diene elastomer is an epoxidized diene elastomer selected from the group consisting of natural rubber (NR), synthetic polyisoprenes (IRs), polybutadienes (BRs), butadiene copolymers, isoprene copolymers, and mixtures of these elastomers.

33. A composite according to any one of the preceding embodiments, in which said composition is devoid of cobalt salts or contains less than 1 phr, preferably less than 0.5 phr, more preferentially less than 0.2 phr and very preferentially less than 0.1 phr, thereof 34. A composite according to any one of the preceding embodiments, in which said composition is devoid of zinc or zinc oxide, or else only comprises a very small amount thereof, preferentially less than 1 phr, preferably less than 0.5 phr, more preferentially less than 0.2 phr.

35. A composite according to any one of the preceding embodiments, in which said composition is devoid of stearic acid, or else only comprises a very small amount thereof, preferentially less than 1 phr, preferably less than 0.5 phr, more preferentially less than 0.2 phr.

36. A finished or semi-finished article comprising a composite according to any one of the preceding embodiments.

37. A tire comprising a composite according to any one of the preceding embodiments.

DETAILED DESCRIPTION OF THE INVENTION

Definitions

The expression "composition based on" should be understood to mean a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the non-crosslinked state.

The expression "part by weight per hundred parts by weight of elastomer" (or phr) should be understood as meaning, for the purposes of the present invention, the part by mass per hundred parts by mass of elastomer.

In the present text, unless expressly indicated otherwise, all the percentages (%) indicated are mass percentages (%).

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, for the purposes of the present invention, that this compound is predominant among the compounds of the same type in the composition, that is to say that it is the one which represents the greatest amount by mass among the compounds of the same type. Thus, for example, a predominant polymer is the polymer representing the greatest mass relative to the total mass of the polymers in the composition. In the same way, a "predominant" filler is that representing the greatest mass among the fillers of the composition. By way of example, in a system comprising just one polymer, the latter is predominant for the purposes of the present invention and, in a system comprising two polymers, the predominant polymer represents more than half of the mass of the polymers.

In contrast, a "minor" compound is a compound which does not represent the greatest fraction by mass among the compounds of the same type. When reference is made to a "phosphonic" function (or radical), this is understood to mean, for the purposes of the present invention, the "phosphonic acid" function and the "phosphonic acid hemiester" function.

For the purposes of the present invention, the term "phosphonic acid" function is understood to mean a function which corresponds to the formula:

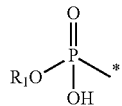

R1=H and —* representing the bond to the rest of the molecule bearing the phosphonic function.

For the purposes of the present invention, the term "phosphonic acid hemiester" function is understood to mean a function which corresponds to the formula:

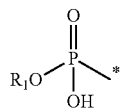

R1=alkyl and —* representing the bond to the rest of the molecule bearing the phosphonic function.

When reference is made to a "sulfonic" function (or radical), this is understood to mean, for the purposes of the present invention, the "sulfonic acid" function of formula

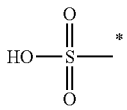

—* representing the bond to the rest of the molecule bearing the sulfonic function.

The carbon-comprising compounds mentioned in the description can be of fossil or biobased origin. In the latter case, they may be partially or totally derived from biomass or may be obtained from renewable starting materials derived from biomass. Polymers, plasticizers, fillers, and the like, are concerned in particular.

Composite of the Invention

The invention relates to a composite based on at least
one reinforcing element and
a rubber composition based on at least
  a. an epoxidized diene elastomer,
  b. a reinforcing filler, and
  c. a system for crosslinking the epoxidized diene elastomer comprising at least:
    a polyacid compound selected from organopolyphosphorus compounds of general formula (I) and polysulfonic acids of general formula (II), and
    a polyphenol compound comprising at least two hydroxyl —OH functions on the same aromatic ring,

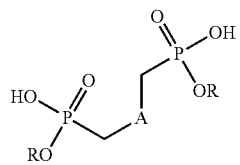

Formula I in which
A represents a covalent bond or a hydrocarbon group comprising at least 1 carbon atom, which is optionally substituted and optionally interrupted by one or more heteroatoms, and
the R symbols represent, independently of one another, a hydrocarbon group comprising at least 1 carbon atom or a hydrogen atom;

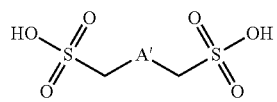

Formula II in which
A' represents a covalent bond or a hydrocarbon group comprising at least 1 carbon atom, which is optionally substituted and optionally interrupted by one or more heteroatoms.

The expression composite "based at least on a reinforcing element and on a composition according to the invention" should be understood as meaning a composite comprising the reinforcing element and the said composition, it having been possible for the composition to react with the surface of the reinforcing element during the various phases of manufacture of the composite, in particular during the crosslinking of the composition or during the manufacture of the composite before crosslinking of the composition.

Said reinforcing element is a threadlike element. It may be totally or partly metallic or textile. The term "threadlike element" refers to an element having a length at least 10 times greater than the greatest dimension of its cross section, irrespective of the shape of said cross section: circular, elliptical, oblong, polygonal, notably rectangular or square or oval. In the case of a rectangular cross section, the threadlike element exhibits the shape of a band.

In particular, said reinforcing element can be of textile nature, that is to say made of an organic, in particular polymeric, material or an inorganic material, such as, for example, glass, quartz, basalt or carbon. The polymeric materials may be of the thermoplastic type, for example aliphatic polyamides, in particular polyamides 6,6, and polyesters, in particular polyethylene terephthalate. The polymeric materials can be of the non-thermoplastic type, such as, for example, aromatic polyamides, in particular aramid, and cellulose, either natural or synthetic, in particular rayon.

In a particular arrangement, said reinforcing element comprises a metallic surface.

The metallic surface of the reinforcing element constitutes at least a part and preferentially the whole of the surface of said element and is intended to come directly into contact with the composition according to the invention. Preferably, the reinforcing element is metallic, that is to say formed of a metallic material.

The composition according to the invention coats at least a part of the reinforcing element, preferentially the whole of said element.

According to a first alternative form of the invention, the metallic surface of the reinforcing element is made of a different material from the remainder of the reinforcing element. In other words, the reinforcing element is made of a material which is at least partly, preferentially completely, covered with a metallic layer which constitutes the metallic surface. The material at least partly, preferentially completely, covered with the metallic surface is metallic or non-metallic, preferably metallic, in nature.

According to a second alternative form of the invention, the reinforcing element is made of one and the same material, in which case the reinforcing element is made of a metal which is identical to the metal of the metallic surface.

According to one embodiment of the invention, the metallic surface comprises a metal selected from the group consisting of iron, copper, zinc, tin, aluminium, cobalt, nickel and the alloys comprising at least one of these metals. The alloys can, for example, be binary or ternary alloys, such as steel, bronze and brass. Preferably, the metallic surface comprises a metal selected from the group consisting of iron, copper, tin, zinc and an alloy comprising at least one of these metals. More preferentially, the metallic surface comprises a metal selected from the group consisting of steel, brass (Cu—Zn alloy), zinc and bronze (Cu—Sn alloy), and even more preferably from the group consisting of brass and steel. Very preferably, the metallic surface is made of brass.

As certain metals are subject to oxidation on contact with ambient air, the metal may be partly oxidized.

When the metallic surface is made of steel, the steel is preferentially a carbon steel or a stainless steel. When the steel is a carbon steel, its carbon content is preferably between 0.01% and 1.2% or between 0.05% and 1.2%, or else between 0.2% and 1.2%, in particular between 0.4% and 1.1%. When the steel is stainless, it preferably comprises at least 11% of chromium and at least 50% of iron.

Rubber Composition of the Invention

The rubber composition according to the invention contains at least
a—an elastomer matrix comprising at least one diene elastomer comprising epoxide functions,
b—a reinforcing filler, and
c—a system for crosslinking said epoxidized polymer comprising at least
a polyacid compound selected from organopolyphosphorus compounds of general formula (I) and polysulfonic acids of general formula (II), and
a polyphenol compound comprising at least two hydroxyl —OH functions on the same aromatic ring, Formula I

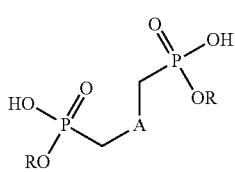

in which
A represents a covalent bond or a hydrocarbon group comprising at least 1 carbon atom, which is optionally substituted and optionally interrupted by one or more heteroatoms, and
the R symbols represent, independently of one another, a hydrocarbon group comprising at least 1 carbon atom or a hydrogen atom;

Formula II

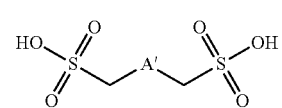

in which
A' represents a covalent bond or a hydrocarbon group comprising at least 1 carbon atom, which is optionally substituted and optionally interrupted by one or more heteroatoms.

Diene Elastomer Comprising Epoxide Functions (or Epoxidized Elastomer)

When reference is made to an epoxidized diene elastomer or rubber (the two terms being in a known way synonymous and interchangeable) or diene elastomer or rubber comprising epoxide functions, it is recalled that what is intended in the broad sense is a synthetic or natural elastomer, which is functionalized, that is to say that it bears epoxide functional groups, whether these are pendent along the elastomer chain or in the elastomer chain, including the chain ends.

It is preferable to use at least one diene elastomer from the group consisting of natural rubber (NR), synthetic polyisoprenes (IRs), polybutadienes (BRs), butadiene copolymers, isoprene copolymers, and mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), and mixtures of such copolymers.

The above diene elastomers may be, for example, block, random, sequential or microsequential elastomers and may be prepared in dispersion or in solution; they may be coupled and/or star-branched or else functionalized with a coupling and/or star-branching or functionalization agent.

Such epoxidized diene elastomers and their processes of preparation are well known to those skilled in the art and are commercially available. Diene elastomers bearing epoxide groups have been described for example in EP 0763564 A1 or EP 1403287 A1.

Epoxidized natural rubbers (abbreviated to "ENRs"), for example, can be obtained in a known way by epoxidation of natural rubber, for example by processes based on chlorohydrin or on bromohydrin or processes based on hydrogen peroxides, on alkyl hydroperoxides or on peracids (such as peracetic acid or performic acid); such ENRs are, for example, sold under the names "ENR-25" and "ENR-50" (respective degrees of epoxidation of 25% and 50%) by Guthrie Polymer. Epoxidized BRs are, themselves also, well known, for example sold by Cray Valley under the name Poly Bd (for example, Poly Bd 605E). Epoxidized SBRs can be prepared by epoxidation techniques well known to a person skilled in the art.

Preferentially, the epoxidized diene elastomer is selected from the group consisting of epoxidized natural rubbers (NRs) (abbreviated as ENRs), epoxidized synthetic polyisoprenes (IRs), epoxidized polybutadienes (BRs), epoxidized butadiene/styrene copolymers (SBRs), and mixtures of these elastomers. More preferably, the epoxidized diene elastomer is selected from the group consisting of epoxidized butadiene polymers and mixtures thereof; particularly the epoxidized diene elastomer is an epoxidized styrene/butadiene copolymer (SBR).

The degree (molar %) of epoxidation of the epoxidized diene elastomers described above can vary to a large extent according to the particular embodiments of the invention, preferably at least 0.2%, more preferentially at least 2%, and preferably at most 60%, more preferentially at most 50%, even more preferentially at most 30%. When the degree of epoxidation is less than 0.2%, there is a risk of the technical effect aimed for being insufficient. Thus, according to one embodiment, the degree of epoxidation is more preferentially within a range from 2% to 30%.

The rubber compositions of the invention can comprise just one epoxidized diene elastomer or a mixture of several epoxidized diene elastomers (which will then be noted in the singular as being "the epoxidized diene elastomer" in order to represent the sum of the epoxidized elastomers of the composition).

Preferentially, the rubber composition of the invention is devoid of non-epoxidized diene elastomer. In other words, the epoxidized diene elastomer, in the broad sense of the sum of the epoxidized diene elastomers, is preferentially the only diene elastomer in the rubber composition of the invention.

Reinforcing Filler

Use may be made of any type of reinforcing filler known for its abilities to reinforce a rubber composition which can be used in the manufacture of tires, for example an organic filler such as carbon black, a reinforcing inorganic filler such as silica, or else a blend of these two types of filler, notably a blend of carbon black and silica.

All carbon blacks, notably blacks of the HAF, ISAF or SAF type, conventionally used in tires ("tire-grade" blacks) are suitable as carbon blacks. Among the latter, mention will be made more particularly of the reinforcing carbon blacks of the 100, 200 or 300 series (ASTM grades), for instance the N115, N134, N234, N326, N330, N339, N347 or N375 blacks, or else, depending on the applications targeted, blacks of higher series (for example N660, N683 or N772). The carbon blacks might, for example, be already incorporated into an isoprene elastomer in the form of a masterbatch (see, for example, applications WO 97/36724 or WO 99/16600).

Mention may be made, as examples of organic fillers other than carbon blacks, of functionalized polyvinyl organic fillers, such as described in applications WO-A-2006/069792, WO-A-2006/069793, WO-A-2008/003434 and WO-A-2008/003435.

The term "reinforcing inorganic filler" should be understood, in the present patent application, by definition, to mean any inorganic or mineral filler, whatever its colour and its origin (natural or synthetic), also referred to as "white filler", "clear filler", indeed even "non-black filler", in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state in which the reinforcing inorganic filler is provided is not important, whether it be in the form of a powder, of micropearls, of granules, of beads or any other appropriate densified form. Of course, "reinforcing inorganic filler" is also understood to mean mixtures of different reinforcing inorganic fillers, in particular of highly dispersible siliceous and/or aluminous fillers such as described hereinafter.

Suitable for use as reinforcing inorganic fillers in particular are mineral fillers of the siliceous type, in particular silica ($SiO_2$), or of the aluminous type, in particular alumina ($Al_2O_3$). The silica used may be any reinforcing silica known to those skilled in the art, especially any precipitated or fumed silica with a BET surface area and a CTAB specific surface area that are both less than 450 $m^2/g$, preferably from 30 to 400 $m^2/g$. Mention will be made, as highly dispersible precipitated silicas (HDSs), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

The reinforcing inorganic filler used, in particular if it is silica, preferably has a BET surface area of between 45 and 400 $m^2/g$, more preferentially of between 60 and 300 $m^2/g$.

Preferentially, the total content of reinforcing filler (carbon black and/or reinforcing inorganic filler such as silica) is between 20 and 180 phr, more preferentially between 30 and 150 phr, the optimum being, in a known manner, different depending on the specific applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy-duty vehicle.

According to a preferential embodiment of the invention, use is made of a reinforcing filler comprising predominantly carbon black as reinforcing filler. More preferentially according to this embodiment, the reinforcing filler consists exclusively of carbon black.

The rubber compositions according to the invention may contain coupling agents for coupling the reinforcing inorganic filler to the diene elastomer when an inorganic filler is used. Use may be made, in a known manner, of an at least bifunctional agent intended to provide a satisfactory connection, of chemical and/or physical nature, between the inorganic filler (surface of its particles) and the diene elastomer, for example bifunctional organosilanes or polyorganosiloxanes.

In the rubber compositions in accordance with the invention, the content of coupling agent is less than 20 phr. Typically, the content of coupling agent represents from 0.5% to 15% by weight, relative to the amount of inorganic filler. In the rubber compositions in accordance with the invention, the content of coupling agent is preferentially between 3 and 12 phr.

The rubber compositions may also contain agents for covering the inorganic filler when an inorganic filler is used. These covering agents are well known (see for example patent applications WO 2006/125533, WO 2007/017060, WO 2007/003408, WO 2009/062733 and EP 0 784 072). Mention will be made for example of hydroxysilanes or hydrolysable silanes such as hydroxysilanes, alkylalkoxysilanes, in particular alkyltriethoxysilanes such as for example 1-octyltriethoxysilane.

In the rubber compositions in accordance with the invention, the content of covering agent is less than 20 phr. Typically, the content of covering agent represents from 0.5% to 15% by weight, relative to the amount of inorganic filler. In the rubber compositions in accordance with the invention, the content of covering agent is preferentially between 3 and 12 phr.

Those skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyl sites, requiring the use of an agent for facilitating the dispersion of the filler in the rubber composition.

Crosslinking System

The crosslinking system according to the invention comprises at least one polyacid compound selected from organopolyphosphorus compounds of general formula (I) and polysulfonic acids of general formula (II). The term "comprises at least one" should be understood to mean "comprises one or more"; when it is a case of "more", the compounds may form a mixture of organopolyphosphorus compounds of general formula (I), a mixture of polysulfonic acids of general formula (II), or a mixture of at least one organopolyphosphorus compound of general formula (I) and of at least one polysulfonic acid of general formula (II).

The organopolyphosphorus compound of use for the purposes of the invention is an organopolyphosphorus compound of general formula (I)

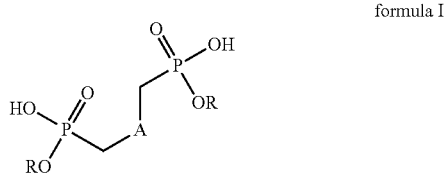

formula I in which
A represents a covalent bond or a hydrocarbon group comprising at least 1 carbon atom, which is optionally substituted and optionally interrupted by one or more heteroatoms, and
the R symbols represent, independently of one another, a hydrogen atom or an alkyl group comprising at least 1 carbon atom.

Preferentially, in general formula (I) as defined above, A represents a covalent bond or a divalent hydrocarbon group comprising at least 1, preferably at least 2, more preferentially at least 4 carbon atoms. Also preferably, when A represents a divalent hydrocarbon group, A represents a divalent hydrocarbon group comprising at most 1800 carbon atoms, preferably at most 100 carbon atoms, more preferentially at most 65 carbon atoms, even more preferentially at most 30 carbon atoms. Thus, according to preferential embodiments, A represents a covalent bond or a divalent hydrocarbon group comprising from 4 to 65 carbon atoms and preferably from 4 to 30 carbon atoms.

Also preferably, in the compound of general formula (I), A is a divalent aliphatic hydrocarbon group or a divalent aromatic hydrocarbon group or a divalent group comprising at least one aliphatic part and one aromatic part.

In the compound of general formula (I), A may be interrupted by at least one heteroatom selected from oxygen, nitrogen and sulfur, preferably oxygen.

Likewise, in the compound of general formula (I), A may be substituted for example by at least one radical selected from the radicals hydroxyl, alkyl, cycloalkyl, aryl, aralkyl and alkoxy. Likewise, in the compound of general formula (I), A may be substituted by a phosphonic function.

According to a preferential embodiment, A does not comprise another phosphonic function and the organopolyphosphorus compound is then an organobiphosphorus compound. The polyacid is then a diacid.

According to another preferential embodiment, in the compound of general formula (I), A is a divalent aliphatic group or a divalent aromatic group or a divalent group comprising at least one aliphatic part and at least one aromatic part, which group is uninterrupted or is interrupted by at least one oxygen atom. More preferentially, the compound of general formula (I) then does not comprise another phosphonic function.

According to a particular embodiment, in the compound of general formula (I), A is a divalent aromatic hydrocarbon group, or a divalent group comprising at least one aliphatic part and one aromatic part. Preferably, then, the divalent aromatic hydrocarbon group or the aromatic part of the divalent group comprising at least one aliphatic part comprises at least 6 carbon atoms and at most 18 carbon atoms, preferably 6 carbon atoms. More preferably, A does not comprise another phosphonic function. Even more preferentially, A is an unsubstituted divalent aromatic group comprising 6 carbon atoms.

Preferentially, in the compound of general formula (I), the R symbols represent, independently of one another, a hydrogen atom or an alkyl group having from 1 to 20 carbon atoms, preferably from 1 to 12 carbon atoms, or a cycloalkyl group having from 5 to 24 carbon atoms, or else an aryl group having from 6 to 30 carbon atoms or an aralkyl group having from 7 to 25 carbon atoms. Preferentially, the R symbols represent an alkyl group having from 1 to 12 carbon atoms, even more preferentially having from 1 to 4 carbon atoms.

Also preferably, the R symbols are identical.

More preferentially, the R symbols represent an alkyl group having from 1 to 12 carbon atoms, further preferentially from 1 to 4 carbon atoms. Even more preferentially, the R symbols are identical and represent an alkyl group having from 1 to 12 carbon atoms, further preferentially having from 1 to 4 carbon atoms.

According to a very particular embodiment, in the compound of general formula (I), A is an unsubstituted divalent group of aromatic type not comprising another phosphonic function and preferably comprising from 6 to 12 carbon atoms, preferably 6, and the R symbols are identical and represent an alkyl group having from 1 to 4 carbon atoms.

The polysulfonic acid compound of use for the purposes of the invention is a polysulfonic acid compound of general formula (II):

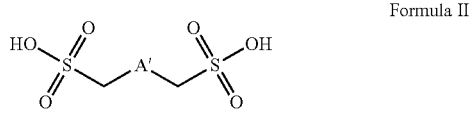

Formula II in which
A' represents a covalent bond or a hydrocarbon group comprising at least 1 carbon atom, which is optionally substituted and optionally interrupted by one or more heteroatoms.

Preferentially, A' represents a covalent bond or a divalent hydrocarbon group comprising at least 1, preferably at least 2, more preferentially at least 4 carbon atoms. Also preferentially, when A' represents a divalent hydrocarbon group, A' represents a divalent hydrocarbon group comprising at most 1800 carbon atoms, preferably at most 100 carbon atoms, more preferentially at most 65 carbon atoms, even more preferentially at most 30 carbon atoms. Even more preferentially, A' represents a covalent bond or a divalent hydrocarbon group comprising from 1 to 65 carbon atoms and preferably from 1 to 30 carbon atoms.

Also preferentially, in the compound of general formula (II), when A' represents a divalent hydrocarbon group, A' is a divalent aliphatic hydrocarbon group or a divalent aromatic hydrocarbon group or a divalent group comprising at least one aliphatic part and one aromatic part. In the compound of general formula (II), when A' represents a divalent hydrocarbon group, A' may be interrupted by at least one heteroatom selected from oxygen, nitrogen and sulfur.

Likewise, in the compound of general formula (II), when A' represents a divalent hydrocarbon group, A' may be substituted by at least one radical selected from the radicals hydroxyl, alkyl, cycloalkyl, aryl, aralkyl and alkoxy. Likewise, in the compound of general formula (II), A' may be substituted by a sulfonic function.

According to a preferential embodiment, A' does not comprise any other sulfonic function. The polysulfonic acid compound is then a disulfonic acid compound.

According to one embodiment of the invention, A' is a covalent bond.

In the present description, the alkyl radicals have from 1 to 15, preferentially from 1 to 10, very preferentially from 1 to 4 carbon atoms. In the present description, the aryl radicals have from 6 to 18, preferably from 6 to 14 carbon atoms.

The organopolyphosphorus compounds of use for the purposes of the invention are either commercially available or are easily prepared by those skilled in the art according to well-known techniques such as the chemical routes described for example in the document Yufeng Li et al., Molecules 2015, 20, 14435-14450; doi:10.3390/molecules200814435.

For example, as organopolyphosphorus compounds of use for the purposes of the invention, mention may be made of phosphonic acid [1,4-phenylenebis(methylene)]bis-P,P'-diethyl ester (CAS No. 4546-05-8), phosphonic acid [1,1'-oxybisethyl]bis-P,P'-dihexyl ester (CAS No. 856638-06-7), phosphonic acid [1,12 dodecanediyl]bis-P,P'-diethyl ester (CAS No. 1229230-54-9);

For example, as commercially available organopolyphosphorus compounds of use for the purposes of the invention, mention may be made of: xylylenebiphosphonic acid from ABCR, methylenebiphosphonic acid.

For example, as polysulfonic acid compounds of use for the purposes of the invention, mention may be made of 1,2-ethylenedisulfonic acid (CAS No. 110-04-3), 1,3-propanedisulfonic acid (21668-77-9).

For example, as commercially available polysulfonic acid compounds of use for the purposes of the invention, mention may be made of: 1,2-ethylenedisulfonic acid, butane-1,4-disulfonic acid (No. 1588441-14-8), 1,3-propanedisulfonic acid from ABCR.

Those skilled in the art will understand that, for the simplification of the formulation of the rubber compositions used in the manufacture of the composites, and also for the improvement of the properties of adhesion of these compositions to the reinforcers, what matters most in the polyacid is the nature of its acid function and not that of the spacer group A or A' which links the functions together.

The crosslinking system according to the invention also contains, as a compound essential to the invention, a polyphenol compound comprising at least one aromatic ring comprising 6 carbon atoms and at least two hydroxyl —OH functions on the same aromatic ring.

According to one embodiment of the invention, the polyphenol compound comprises an aromatic ring comprising 6 carbon atoms and at least two hydroxyl —OH functions on the aromatic ring, and corresponds to the general formula (III)

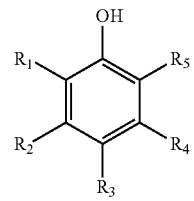

Formula III in which at least the $R_1$, $R_2$, $R_3$, $R_4$ and $R_5$ groups, independently of one another, denote groups selected from a hydrogen atom, the radicals hydroxyl, thiol, hydroxyalkenyl, carboxyl, hydrogenocarbonyl, alkyl, carboxylalkyl, carboxylalkenyl, carbonylalkyl, alkoxy, alkylthioxy, aryl, aryloxy, arylthioxy, arylcarbonyl, amino, aminoalkyl, ethers, esters, and thioesters, with the proviso that at least one of $R_1$, $R_2$, $R_3$, $R_4$ and $R_5$ denotes a hydroxyl radical.

The term "ether group" is understood to mean a group of formula —$(C_nH_{2n-2})$—O-alkyl. The term "ester group" is understood to mean a group of formula —$(C_nH_{2n})$—CO—O-alkyl. The term "thioester group" is understood to mean a group of formula —$(C_nH_{2n})$—CO—S-alkyl. n is as defined above.

The term "carboxyl group", or "carboxylic acid function", is understood to mean a group of formula —COOH in which the carbon atom is linked via a double bond to an oxygen atom and via a single bond to a hydroxyl —OH group.

The term "alkyl group" is understood to mean a group of formula —$C_nH_{2n+1}$.

The term "hydrogenocarbonyl group" is understood to mean a group of formula —CHO in which the carbon atom is linked via a double bond to an oxygen atom and via a single bond to a hydrogen atom.

The term "carboxyalkenyl group" is understood to mean a group of formula —$(C_nH_{2n})$—COOH. The term "carbonylalkyl group" is understood to mean a group of formula —$(C_nH_{2n})$—CHO. The term "hydroxyalkenyl group" is understood to mean a group of formula —$C_nH_{2n}(OH)$.

The term "aryloxy group" is understood to mean a group of general formula —O-aryl, in which an aryl group is linked to an oxygen atom. The term "arylthioxy group" is understood to mean a group of general formula —S-aryl, in which an aryl group is linked to a sulfur atom. The term "arylcarbonyl group" is understood to mean a group of general formula —CO-aryl, in which an aryl group is linked to a carbonyl group.

The term "amino group" is understood to mean a group of formula —$NH_2$.

The term "aminoalkyl radical" is understood to mean a radical of formula —$C_nH_{2n}$—$NH_2$.

The term "ether group" is understood to mean a group of formula —$(C_nH_{2n-2})_x$—O-alkyl. The term "ester group" is understood to mean a group of formula —$(C_nH_{2n})_x$—CO—O-alkyl. The term "thioester group" is understood to mean a group of formula —$(C_nH_{2n})_x$—CO—S-alkyl. In these definitions, x is 0 or 1.

In the preceding definitions, n is an integer advantageously between 1 and 10, preferentially between 1 and 6, very preferentially between 1 and 4.

According to this embodiment of the invention, the polyphenol compound preferably corresponds to formula (III) in which $R_1$, $R_2$, $R_3$, $R_4$ and $R_5$, independently of one another, denote groups selected from a hydrogen atom, the radicals hydroxyl, carboxyl, and ester. Even more preferentially, one or two of $R_1$, $R_2$, $R_3$, $R_4$ and $R_5$ denote(s) a hydroxyl radical and another of $R_1$, $R_2$, $R_3$, $R_4$ and $R_5$ denotes a carboxyl or ester radical, the others denoting a hydrogen atom.

In the definitions above, the term "aryl" is understood to mean an aromatic substituent comprising from 6 to 14 carbon atoms, preferably 6 to 10 carbon atoms, preferably 6 carbon atoms.

According to this embodiment of the invention, the polyphenol compound preferably comprises 2 or 3 hydroxyl —OH functions on the aromatic ring.

Among the polyphenol compounds having an aromatic ring that are of use for the purposes of the invention, mention may be made of gallic acid, pyrogallol, methyl 3,4,5-trihydroxybenzoate, 3,4-dihydroxybenzoic acid, phloroglucinol. Very preferably, the polyphenol compound is gallic acid.

According to another embodiment of the invention, the polyphenol compound is a compound comprising at least two and preferably at least three aromatic rings each comprising 6 carbon atoms, each ring comprising at least 2 hydroxyl —OH functions.

The molar mass of the polyphenol compound is preferentially greater than 600 g/mol, preferentially greater than 800 g/mol, preferably greater than 1000 g/mol and very preferably greater than 1200 g/mol.

Preferably, the polyphenol compound is selected from gallotannins, that is to say esters of gallic acid and of polyol, the polyol preferably being selected from pentoses and hexoses. Preferably, the polyphenol compound is selected from esters of glucose and of gallic acid, with preference selected from polygalloyl glucoses comprising from 3 to 10 galloyl units, preferably comprising from 5 to 10 galloyl units. With preference, the polyphenol compound is selected from trigalloyl glucoses, pentagalloyl glucoses and decagalloyl glucoses, and preferably from 1,2,6-trigalloyl glucose, 1,3,6- trigalloyl glucose, 1,2,3,4,6-pentagalloyl glucose and tannic acid (or beta-D glucose pentakis(3,4-dihydroxy-5-((3,4,5-trihydroxybenzoyl)oxy)benzoate)). Very preferably, the polyphenol compound is tannic acid.

These polyphenol compounds of use for the purposes of the invention are commercially available. For example, as commercially available polyphenol compounds of use for the purposes of the invention, mention may be made of these same compounds sold by Sigma-Aldrich.

According to one embodiment of the invention, the crosslinking system according to the invention may contain an imidazole. Such a compound is known to those skilled in the art and described in particular in documents WO2014095582, WO2014095583, WO2014095585 and WO2014095586.

According to this embodiment of the invention, the imidazole content is preferentially in a range extending from 0.01 to 4 molar equivalents, and preferably from 0.01 to 3 molar equivalents, relative to the acid functions present on the polyacid compounds of general formulae (I) and (II).

The imidazoles of use for the purposes of the invention are either commercially available or are easily prepared by those skilled in the art according to well-known techniques, as described, for example, in JP2012211122 and JP2007269658 or in Science of Synthesis, 2002, 12, 325-528.

For example, as commercially available imidazoles of use for the purposes of the invention, mention may be made of 1,2-dimethylimidazole, 1-decyl-2-methylimidazole or 1-benzyl-2-methylimidazole.

A crosslinking system comprising at least one polyacid compound, selected from those of general formula (I) and those of formula (II), and an imidazole could be a crosslinking system in which said polyacid compound and said imidazole have been reacted together beforehand prior to their introduction into the composition.

According to one embodiment of the invention, when the reinforcing filler predominantly contains a reinforcing inorganic filler, such as silica, or when the reinforcing filler consists of such a reinforcing inorganic filler, then the polyphenol compound of the crosslinking system is advantageously a compound comprising at least two, and preferably at least three, aromatic rings each comprising 6 carbon atoms, each ring comprising at least 2 hydroxyl —OH functions, as defined above. According to this embodiment, the polyphenol compound is preferably tannic acid.

The content of polyacid compound in the rubber composition according to the invention is preferentially at least 0.2 and at most 20 phr, preferably is in a range extending from 0.2 to 10 phr. Below 0.2 phr of polyacid compound, the crosslinking effect is not significant, whereas, above 20 phr of polyacid compound, the limiting properties of the composition are detrimentally affected.

The content of polyphenol compound is preferentially at least 0.2 phr, preferably at least 0.5 phr, and at most 50 phr, preferably at most 25 phr. Below 0.2 phr of polyphenol compound, there would be no effect on the crosslinking or the adhesion, whereas, above 20 phr of polyphenol compound, side reactions might take place. The polyphenol content is more particularly within a range extending from 0.2 to 50, preferably from 0.5 to 25 phr.

Various Additives

The rubber compositions in accordance with the invention may also include all or some of the usual additives known to a person skilled in the art and usually used in rubber compositions for tires, in particular compositions of internal layers, as defined subsequently in the present patent application, such as for example plasticizers (plasticizing oils and/or plasticizing resins), reinforcing or non-reinforcing fillers other than those mentioned above, pigments, protective agents, such as antiozone waxes, chemical antiozonants, antioxidants, anti-fatigue agents or reinforcing resins (such as described, for example, in patent application WO 02/10269).

Preferably, the rubber composition according to the invention is devoid of a vulcanization system or contains less than 1 phr, preferably less than 0.5 phr and more preferentially less than 0.2 phr thereof. Thus, the rubber composition according to the invention is preferentially devoid of molecular sulfur or contains less than 1 phr, preferably less than 0.5 phr and more preferentially less than 0.2 phr thereof. Likewise, the composition is preferentially devoid of any vulcanization activator or accelerator as are known to a person skilled in the art, or contains less than 1 phr, preferably less than 0.5 phr and more preferentially less than 0.2 phr thereof. In particular, the rubber composition according to the invention is preferentially devoid of zinc or zinc oxide, or contains less than 1 phr, preferably less than 0.5 phr and very preferably less than 0.2 phr thereof. In particular, also, the rubber composition according to the invention is preferentially devoid of stearic acid, or contains less than 1 phr, preferably less than 0.5 phr and very preferably less than 0.2 phr thereof.

Similarly, the rubber composition according to the invention is preferentially devoid of cobalt salts, as are known to a person skilled in the art, and the effect of which known to a person skilled in the art is a better durability of the adhesion, or contains less than 1 phr, preferably less than 0.5 phr, more preferentially less than 0.2 phr and very preferentially less than 0.1 phr thereof.

Thus, surprisingly, very good adhesion of the composition according to the invention to reinforcing cords is obtained without it being necessary to use sulfur and cobalt salts.

Preparation of the Rubber Compositions

The rubber composition in accordance with the invention can be manufactured in appropriate mixers using two successive preparation phases well known to a person skilled in the art:
- a first phase of thermomechanical working or kneading, which may be performed in a single thermomechanical step during which all the necessary constituents, in particular the elastomeric matrix, the fillers and the optional various other additives, are introduced into an appropriate mixer, such as a standard internal mixer (for example of "Banbury" type). The incorporation of the filler in the elastomer can be carried out in one or more goes by thermomechanically kneading. In the case where the filler is already incorporated, in full or in part, in the elastomer in the form of a masterbatch, as is described, for example, in applications WO 97/36724 and WO 99/16600, it is the masterbatch which is directly kneaded and, if appropriate, the other elastomers or fillers present in the composition which are not in the masterbatch form, and also the optional various other additives, are incorporated. The first phase is performed at high temperature, up to a maximum temperature of between 110° C. and 190° C., preferably between 130° C. and 180° C., for a period of time generally of between 2 and 10 minutes.
- a second phase of mechanical working, which is carried out in an external mixer, such as an open mill, after cooling the mixture obtained during the first phase down to a lower temperature, typically of less than 110° C., for example between 40° C. and 100° C. The crosslinking system is then incorporated and the combined mixture is then mixed for a few minutes, for example between 2 and 15 min.

The final composition thus obtained can subsequently be calendered or extruded, for example in the form of a sheet or of a plaque, in particular for laboratory characterization, or else for manufacture of the composite according to the invention.

Preparation of the Composites According to the Invention

The composite in accordance with the invention can be in the green state (before crosslinking of the rubber composition) or in the cured state (after crosslinking of the rubber composition). The composite is cured after bringing the reinforcing element(s) into contact with the rubber composition according to the invention.

The composite may be manufactured via a process which comprises the following steps:
  producing two layers of the composition according to the invention,
  sandwiching the reinforcing element(s) in the two layers by depositing it (them) between the two layers,
  where appropriate, curing the composite.

Alternatively, the composite can be manufactured by depositing the reinforcing element on a portion of a layer, the layer is then folded over on itself to cover the reinforcing element, which is thus sandwiched over its entire length or a part of its length.

The layers may be produced by calendering or profiled element extrusion. During the curing of the composite, the rubber composition is crosslinked.

When the composite is intended to be used in a tire, the curing of the composite generally takes place during the curing of the casing of the tire.

Finished or Semi-Finished Article and Tire

A subject of the invention is also a finished or semi-finished article comprising a composite according to the invention. The improved adhesion properties allow applications in various and wide-ranging fields requiring finished or semi-finished articles. The composites according to the invention may thus be used in the manufacture of finished products such as tubes, belts, tires, conveyor belts, etc.

The tire, also a subject of the invention, has the essential feature of comprising the composite in accordance with the invention. The tire may be in the green state (before crosslinking of the rubber composition) or in the cured state (after crosslinking of the rubber composition). Generally, during the manufacture of the tire, the composite is deposited in the green state (i.e. before crosslinking of the rubber composition) in the structure of the tire before the step of curing the tire.

Examples

Measurement Methods

Tensile Tests

The tests were performed in accordance with the French standard NF T 46-002 of September 1988. All the tensile measurements were performed under standard conditions of temperature (23±2° C.) and hygrometry (50%±5% relative humidity), according to French standard NF T 40-101 (December 1979).

At second elongation (that is to say after accommodation), the nominal secant modulus, calculated with respect to the initial cross section of the test specimen (or apparent stress, in MPa) is measured at 10% and 100% elongation, denoted $MA_{10}$ and $MA_{100}$, respectively. All these measurements are taken on cured (or crosslinked) test specimens.

The results are expressed in base 100, the value 100 being assigned to the control. A result of greater than 100 indicates that the composition of the example under consideration has a greater stiffness than that of the control.

Preparation of the Rubber Compositions

The following procedure is used to prepare the different rubber compositions: the epoxidized polymer and then all the other constituents of the mixture except for the crosslinking system are successively introduced into an internal mixer (final degree of filling: approximately 70% by volume), the initial vessel temperature of which is approximately 60° C. Thermomechanical working is then performed in one step until a maximum "dropping" temperature of 150° C. is reached. The mixture thus obtained is recovered, the crosslinking system is incorporated and the whole is cooled on an external mixer (homofinisher) at 30° C., while mixing.

The compositions prepared are presented in Table 1.

Preparation of Composite Test Specimens

The rubber compositions thus prepared are used to make a composite in the form of a test specimen, according to the following protocol:

A block of rubber, consisting of two plaques applied to each other before curing, is prepared. The two plaques of the block consist of the same rubber composition. During the preparation of the block, metallic reinforcers are trapped between the two plaques in the green state, an equal distance apart and while leaving to protrude, on either side of these plaques, an end of the metallic reinforcer having a length sufficient for the subsequent tensile test. The block including the metallic reinforcers is then placed in a mould adapted to the targeted test conditions and left to the discretion of a person skilled in the art; by way of example, in the present case, the block is cured at 170° C. for a time ranging from 50 min to 100 min according to the composition under a pressure of 5.5 tonnes.

Each metallic reinforcer consists of two wires made of steel containing 0.7% carbon, 30/100ths of a millimetre in diameter, twisted together, and the brass coating comprises 63% copper.

Adhesion Test

On conclusion of the curing, the test specimen thus formed of the crosslinked block and of the metallic reinforcers is placed in the jaws of a tensile testing machine adapted to make it possible to test each section in isolation, at a given speed and a given temperature according to the method described in the standard ASTM D 2229-02 (for example, in the present case, at 100 mm/min and ambient temperature).

The levels of adhesion are characterized by measuring the "tearing-out" force for extracting the sections from the test specimen.

The results are expressed in base 100 relative to a control test specimen which contains metallic reinforcers of identical nature to that of the test specimen tested and which contains the rubber composition "T1" presented in Table 1.

A value higher than that of the control test specimen, arbitrarily set at 100, indicates an improved result, i.e. a higher tearing-out force than that of the control test specimen.

Test specimen T1 comprises a crosslinking system based on a dicarboxylic acid and an imidazole compound known for an epoxidized natural rubber composition.

The compositions C1, C2, C3, C4, as mixture with black on the one hand, and C5, as mixture with silica on the other, on which the adhesion tests were carried out display good adhesion properties.

TABLE 1

|  | T1 | C1 | C2 | C3 | C4 | T2 | C5 |
|---|---|---|---|---|---|---|---|
| ENR(1) | 100 | 100 | 100 | 100 | 100 | 100 | 100 |
| Carbon black (2) | 50 | 50 | 50 | 60 | 60 |  |  |
| Silica (3) |  |  |  |  |  | 60 | 60 |
| Silane (4) |  |  |  |  |  | 4.8 | 4.8 |
| 6-PPD (5) | 1.5 | 1.5 | 1.5 | 1.5 | 1.5 | 1.5 | 1.5 |
| Bisphosphonic hemiester (6a) |  | 2.1 | 2.1 |  |  |  |  |
| Disulfonic acid (6b) |  |  |  | 1.24 | 1.24 |  | 1.24 |
| Dodecanedioic acid (6c) | 1.5 |  |  |  |  | 1.5 |  |
| Imidazole BMI (7) | 2.24 |  | 2.24 |  | 2.24 | 2.24 |  |
| Gallic acid (8) | 4.7 | 4.7 | 4.7 | 4.7 | 4.7 |  |  |
| Tannic acid (9) |  |  |  |  |  | 2.65 | 2.65 |
| Maximum tearing-out force | 100 | 105 | 159 | 102 | 137 | 100 | 135 |

All the compositions are given in phr;
(1) Epoxidized Natural Rubber, ENR-25 from Guthrie Polymer
(2) N326
(3) Silica 160MP, Zeosil 1165MP from Rhodia
(4) Dynasylan Octeo from Degussa
(5) N-(1,3-Dimethylbutyl)-N-phenyl-para-phenylenediamine (Santoflex 6-PPD from Flexsys)
(6) Polyacid a-Bisphosphonic hemiester

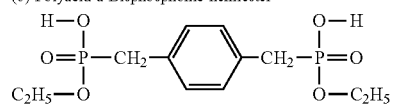

M = 322.34 g/mol, synthesized according to the procedure described in Molecules 2015, 20, 14435-14450; doi:10.3390/molecules 200814435;
b-Polysulfonic acid: 1,2-ethanedisulfonic acid dihydrate M = 190.18 g/mol, CAS 110-04-3, from ABCR,
c-Dodecanedioic acid from Sigma-Aldrich, M = 230.3 g/mol,
(7) 1-Benzyl-2-methylimidazole, CAS = 13750-62-4, provided by Sigma-Aldrich
(8) Gallic acid, CAS: 149-91-7 from Sigma-Aldrich
(9) Tannic acid, CAS: 1401-55-4 from Sigma-Aldrich

The invention claimed is:

1. A composite based on at least one reinforcing element and on a rubber composition based on at least:
   (a) an epoxidized diene elastomer;
   (b) a reinforcing filler; and
   (c) a system for crosslinking the epoxidized diene elastomer comprising at least:
      a polyacid compound selected from organopolyphosphorus compounds of general formula (I) and polysulfonic acids of general formula (II); and
      a polyphenol compound comprising at least one aromatic ring comprising 6 carbon atoms and at least two hydroxyl —OH functions on the same aromatic ring,

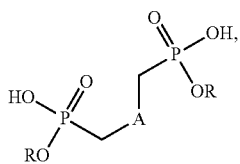

Formula I in which
   A represents a covalent bond or a hydrocarbon group comprising at least 1 carbon atom, which is optionally substituted and optionally interrupted by one or more heteroatoms, and
   each R symbol represents, independently of one another, a hydrocarbon group comprising at least 1 carbon atom or a hydrogen atom, and

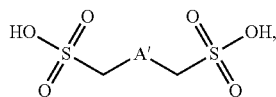

Formula II in which
   A' represents a covalent bond or a hydrocarbon group comprising at least 1 carbon atom, which is optionally substituted and optionally interrupted by one or more heteroatoms.

2. The composite according to claim 1, wherein the at least one reinforcing element comprises a metallic surface.

3. The composite according to claim 2, wherein the metal of the metallic surface is brass or steel.

4. The composite according to claim 1, wherein the polyacid compound is a diacid.

5. The composite according to claim 1, wherein the hydrocarbon group, of A or of A', comprising at least 1 carbon atom, which is optionally substituted and optionally interrupted by one or more heteroatoms is a divalent hydrocarbon group comprising at least 2 carbon atoms and at most 100 carbon atoms.

6. The composite according to claim 1, wherein the system for crosslinking the epoxidized diene elastomer comprises an imidazole compound.

7. The composite according to claim 1, wherein the R symbols are identical and represent an alkyl group having from 1 to 12 carbon atoms.

8. The composite according to claim 1, wherein the polyphenol compound comprises an aromatic ring of 6 carbon atoms and at least two hydroxyl —OH functions on the same aromatic ring, and corresponds to general formula (III)

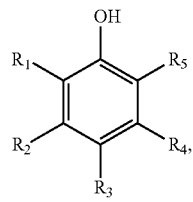

Formula III in which
   $R_1$, $R_2$, $R_3$, $R_4$ and $R_5$, independently of one another, denote groups selected from a hydrogen atom, the radicals hydroxyl, thiol, hydroxyalkenyl, carboxyl, hydrogenocarbonyl, alkyl, carboxylalkyl, carboxylalkenyl, carbonylalkyl, aryl, aryloxy, arylthioxy, arylcarbonyl, amino, aminoalkyl, ethers, esters, and thioesters, with the proviso that at least one of $R_1$, $R_2$, $R_3$, $R_4$ and $R_5$ denotes a hydroxyl radical.

9. The composite according to claim 1, wherein the polyphenol compound is a compound comprising at least two aromatic rings comprising 6 carbon atoms, each ring comprising at least 2 hydroxyl —OH functions.

10. The composite according to claim 9, wherein the polyphenol compound is tannic acid.

11. The composite according to claim 1, wherein the reinforcing filler predominantly comprises carbon black.

12. The composite according to claim 9, wherein the reinforcing filler predominantly comprises silica.

13. The composite according to claim 1, wherein the rubber composition is devoid of cobalt salts or contains less than 1 phr thereof.

14. The composite according to claim 1, wherein the rubber composition is devoid of zinc or zinc oxide and of stearic acid, or the rubber composition comprises a very small amount thereof.

15. A tire comprising the composite according to claim 1.

* * * * *